United States Patent
Al-Yami et al.

(10) Patent No.: US 11,359,125 B2
(45) Date of Patent: Jun. 14, 2022

(54) INVERT-EMULSION DRILLING FLUIDS AND METHODS FOR REDUCING LOST CIRCULATION IN A SUBTERRANEAN FORMATION USING THE INVERT-EMULSION DRILLING FLUIDS

(71) Applicant: Saudi Arabian Oil Company, Dhahran (SA)

(72) Inventors: Abdullah Al-Yami, Dhahran (SA); Vikrant Wagle, Dhahran (SA); Sara Alkhalaf, Al-Khobar (SA); Khawlah A. Alanqari, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/859,201

(22) Filed: Apr. 27, 2020

(65) Prior Publication Data

US 2021/0332282 A1 Oct. 28, 2021

(51) Int. Cl.
C09K 8/36 (2006.01)
C09K 8/28 (2006.01)
C09K 8/035 (2006.01)
C09K 8/516 (2006.01)

(52) U.S. Cl.
CPC .............. *C09K 8/28* (2013.01); *C09K 8/035* (2013.01); *C09K 8/516* (2013.01); *C09K 2208/10* (2013.01); *C09K 2208/18* (2013.01)

(58) Field of Classification Search
CPC .......... C09K 8/28; C09K 8/516; C09K 8/035; C09K 2208/10; C09K 2208/18
See application file for complete search history.

(56) References Cited

U.S. PATENT DOCUMENTS

| | | |
|---|---|---|
| 776,797 A | 12/1904 | Plant |
| 796,131 A | 8/1905 | Washington |
| 4,637,883 A | 1/1987 | Patel et al. |
| 5,189,012 A | 2/1993 | Patel et al. |
| 6,861,392 B2 | 3/2005 | Shaarpour |
| 6,887,832 B2 | 5/2005 | Kirsner et al. |
| 7,284,611 B2 | 10/2007 | Reddy et al. |
| 7,462,580 B2 | 12/2008 | Kirsner et al. |
| 7,488,704 B2 | 2/2009 | Kirsner et al. |
| 7,488,705 B2 | 2/2009 | Reddy et al. |
| 7,939,470 B1 | 5/2011 | Wagle et al. |
| 8,043,997 B2 | 10/2011 | Whitfill et al. |
| 8,569,213 B2 | 10/2013 | Miller et al. |
| 8,905,134 B2 | 12/2014 | Miller |
| 8,999,898 B2 | 4/2015 | Zhou et al. |
| 9,410,071 B1 | 8/2016 | Jiang et al. |
| 9,982,182 B2 | 5/2018 | Muller et al. |
| 10,035,941 B2 * | 7/2018 | Whitfill ................ C09K 8/516 |
| 10,041,300 B2 | 8/2018 | Maghrabi et al. |
| 10,066,143 B2 | 9/2018 | Whitfill et al. |
| 2005/0037929 A1 | 2/2005 | Kirsner et al. |
| 2009/0221452 A1 * | 9/2009 | Whitfill ................. C09K 8/03 507/104 |
| 2010/0319915 A1 | 12/2010 | Bustos et al. |
| 2012/0132421 A1 | 5/2012 | Loiseau et al. |
| 2014/0038857 A1 | 2/2014 | Miller et al. |
| 2015/0368538 A1 | 12/2015 | Wang et al. |
| 2016/0298015 A1 | 10/2016 | Gupta et al. |
| 2020/0148934 A1 | 5/2020 | Wagle et al. |
| 2021/0079285 A1 * | 3/2021 | Davis ................... C09K 8/34 |
| 2021/0095189 A1 * | 4/2021 | May ..................... C09K 8/502 |

FOREIGN PATENT DOCUMENTS

CN 110147644 A 8/2019

OTHER PUBLICATIONS

International Search Report and Written Opinion dated Aug. 11, 2021 pertaining to International application No. PCT/US2021/028339 filed Apr. 21, 2021, 15 pages.

* cited by examiner

*Primary Examiner* — Kumar R Bhushan
(74) *Attorney, Agent, or Firm* — Dinsmore & Shohl LLP

(57) ABSTRACT

An invert-emulsion drilling fluid may include a dispersed aqueous phase including an aqueous base fluid, a continuous non-aqueous phase including a non-aqueous base fluid, and a first bridging package. The first bridging package may include one or more particulate carbonate materials. All of the particulate carbonate materials of the invert-emulsion drilling fluid may be part of the first bridging package. The first bridging package may have a trimodal particle size distribution such that the particle size distribution of the first bridging package includes three peaks, wherein each peak may be in the range of less than or equal to 300 microns in the particle size distribution. The invert-emulsion drilling fluid may be included in methods for reducing lost circulation in subterranean formations during drilling operations.

18 Claims, 2 Drawing Sheets

INVERT-EMULSION DRILLING FLUIDS AND METHODS FOR REDUCING LOST CIRCULATION IN A SUBTERRANEAN FORMATION USING THE INVERT-EMULSION DRILLING FLUIDS

BACKGROUND

Field

The present disclosure relates to natural resource well drilling and, more specifically, to drilling fluids and methods for the use of such.

Technical Background

Drilling operations, such as drilling new wellbores for hydrocarbon extraction, may include the practice of continuously circulating a drilling fluid (sometimes known as a drilling mud) through the wellbore during the operation. The drilling fluid may be pumped into the drill pipe to the bottom of the borehole, where the drilling fluid then flows upwardly through an annular space between the wellbore wall and the drill pipe and finally returns to the surface and flows out of the wellbore, where it may be recovered. During drilling, the drilling solids, such as portions of the drilled geological formation, may be carried by the drilling fluid from at or near the bottom of the wellbore to the surface. After its return to the surface, the drilling fluid may be mechanically or chemically treated to remove captured solids and drill cuttings from the drilling fluid before recirculation back through the wellbore. Emulsion drilling fluids, such as invert-emulsion drilling fluids, are commonly used during these drilling operations, particularly in high pressure and high temperature drilling operations. Invert-emulsion drilling fluids, which include a dispersed aqueous phase and a continuous non-aqueous phase, typically incorporate bridging material to bridge across fractures in the wellbore, thereby preventing lost circulation of the drilling fluids. However, many bridging materials have limitations in their applications. For example, some bridging materials are not capable of plugging highly-fractured wellbores and, as such, result in lost circulation of the drilling fluids during drilling operations.

SUMMARY

Accordingly, there is an ongoing need for improved drilling fluids incorporating bridging materials for use in invert-emulsion drilling fluids. The bridging packages of the present disclosure may have a trimodal size distribution and, as a result, may be capable of plugging highly-fractured wellbores, resulting, in some embodiments, in reduced lost circulation of the invert-emulsion drilling fluids. Moreover, the resulting invert-emulsion drilling fluids, which include the bridging packages having a trimodal size distribution, may have improved performance in preventing machinery from becoming immovable within the wellbore during drilling operations compared to typical emulsion drilling fluids.

According to one or more embodiments of the present disclosure, an invert-emulsion drilling fluid may include a dispersed aqueous phase including an aqueous base fluid, a continuous non-aqueous phase including a non-aqueous base fluid, and a first bridging package. The first bridging package may consist of one or more particulate carbonate materials. All particulate carbonate materials of the invert-emulsion drilling fluid may be part of the first bridging package. The first bridging package may have a trimodal particle size distribution such that the particle size distribution of the first bridging package comprises three peaks, wherein each peak is in the range of less than or equal to 300 microns in the particle size distribution.

According to one or more additional embodiments of the present disclosure, a method for reducing lost circulation subterranean formation during drilling operations may include introducing an invert-emulsion drilling fluid into a subterranean formation. The invert-emulsion drilling fluid may include a dispersed aqueous phase including an aqueous base fluid, a continuous non-aqueous phase including a non-aqueous base fluid, and a first bridging package. The first bridging package may consist of one or more particulate carbonate materials. All particulate carbonate materials of the invert-emulsion drilling fluid may be part of the first bridging package. The first bridging package may have a trimodal particle size distribution such that the particle size distribution of the first bridging package comprises three peaks, wherein each peak is in the range of less than or equal to 300 microns in the particle size distribution.

According to one or more yet additional embodiments of the present disclosure, an invert-emulsion drilling fluid may include a dispersed aqueous phase including an aqueous base fluid, a continuous non-aqueous phase including a non-aqueous base fluid, manganese tetroxide ($Mn_3O_4$), and a first bridging package having trimodal particle size distribution. The invert-emulsion drilling fluid may include from 10 wt. % to 30 wt. % of the aqueous base fluid, from 20 wt. % to 50 wt. % of the non-aqueous base fluid, from 15 wt. % to 50 wt. % $Mn_3O_4$, and from 3 wt. % to 12 wt. % of the first bridging package, all of which are based on the total weight of the invert-emulsion drilling fluid. The first bridging package may include a first portion of particulate carbonate materials, a second portion of particulate carbonate materials, and a third portion of particulate carbonate materials. The first portion of particulate carbonate materials may have a nominal particle size of from 20 microns to 30 microns. The second portion of particulate carbonate materials may have a nominal particle size of from 40 microns to 60 microns. The third portion of particulate carbonate materials may have a nominal median particle size from of 125 microns to 175 microns. The first bridging package may include at least 35 wt. % of a combination of the first portion of particulate carbonate materials, the second portion of particulate carbonate materials, and the third portion of particulate carbonate materials, based on the total weight of the first bridging package.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

BRIEF DESCRIPTION OF THE DRAWINGS

For the purpose of illustrating the concepts described in the present disclosure, there is shown in the drawings a form that is exemplary; it being understood, however, the present disclosure is not limited to the precise arrangements shown.

DETAILED DESCRIPTION

Figure 1:
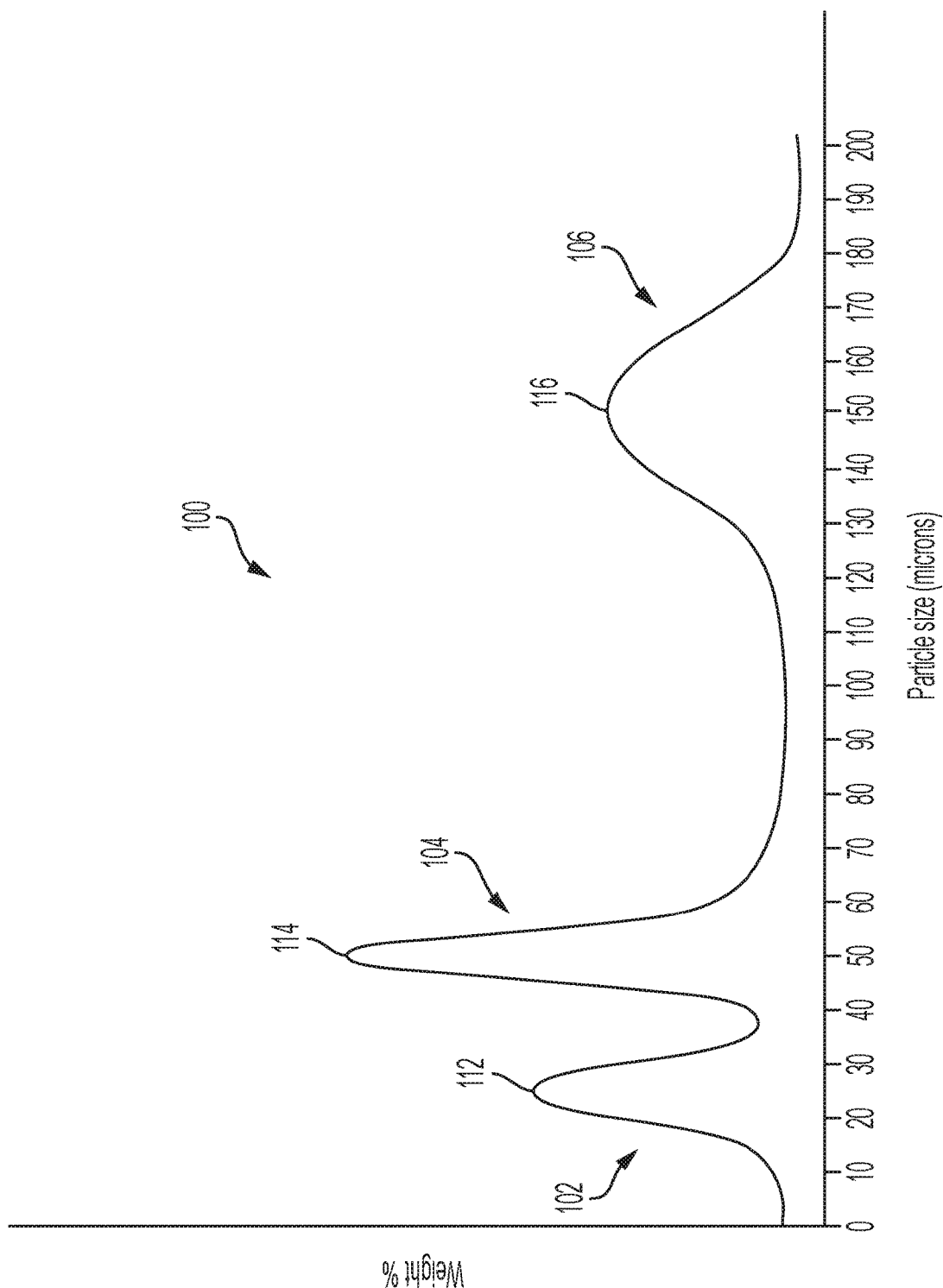
FIG. 1 graphically depicts a particle size distribution profile of the first bridging package, according to one or more embodiments presently presented.

The present disclosure is directed to invert-emulsion drilling fluids and methods for using such drilling fluids where, in some embodiments, the drilling fluids may reduce lost circulation in a subterranean formation. A subterranean formation is the fundamental unit of lithostratigraphy. As used in the present disclosure, the term "subterranean formation" may refer to a body of rock that is sufficiently distinctive from the surrounding rock bodies such that the body of rock may be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions contain hydrocarbons and others do not. To recover hydrocarbons from the hydrocarbon regions of the subterranean formation, production wells are drilled. The wellbore of production wells may serve to connect hydrocarbon-containing regions of the subterranean formation to the surface and enable hydrocarbons to travel from the subterranean formation to the surface. As used in the present disclosure, the term "wellbore" may refer to the drilled hole or borehole, including the openhole or uncased portion, of a well.

According to one or more embodiments, to drill a subterranean well, a drill string is inserted into a pre-drilled hole and rotated to cut into the rock at the bottom of the hole, producing cuttings. Drilling fluids, also referred to as drilling muds, may be pumped down through the drill string during drilling to remove cuttings from the bottom of the subterranean well. Drilling fluids may lift cuttings away from the bottom of the subterranean well when recirculated back to the surface. Drilling fluids may serve a number of additional functions as well. For example, drilling fluids may also provide hydrostatic pressure in the subterranean well sufficient to support the sidewalls of the subterranean well. This hydrostatic pressure may prevent the sidewalls from collapsing and caving in on the drill string as well as prevent fluids present in the subterranean formation from flowing into the subterranean well during drilling.

As previously stated, the drilling fluids of the present disclosure may be characterized as an invert-emulsion. As used in the present disclosure, the term "invert-emulsion" (also referred to as an invert-emulsion drilling fluid) refers to a two-phase drilling fluid including an aqueous phase, which is dispersed within a continuous non-aqueous phase. The invert-emulsion may be characterized as a water-in-oil emulsion including the dispersed aqueous phase and the continuous non-aqueous phase. As used in the present disclosure, the term "aqueous" refers to fluids or solutions including water as the major constituent. The term "non-aqueous" refers to fluids or solutions including a major constituent that is immiscible with water.

Accordingly, the invert-emulsion drilling fluids of the present disclosure may include a dispersed aqueous phase and a continuous non-aqueous phase. The aqueous phase may include an aqueous base fluid. The aqueous base fluid may include one or more of fresh water, salt water, brine, municipal water, formation water, produced water, well water, filtered water, distilled water, and seawater, or combinations of these. Without being bound by any particular theory, it is believed that dispersed aqueous phases incorporating salt or other organic compounds, such as brine, may be suitable to control the density of the invert-emulsion drilling fluid. For example, increasing the saturation of the dispersed aqueous phase by increasing the concentration of salt or other organic compounds in the aqueous phase may increase the density of the invert-emulsion drilling fluid. Suitable salts may include one or more of alkali metal chlorides, hydroxides, and carboxylates. For example, the aqueous phase may include one or more of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides.

The continuous non-aqueous phase may include a non-aqueous base fluid, such as an oil, or non-aqueous solution, such as an oil and one or more organic or inorganic compounds dissolved in the oil or otherwise completely miscible with the oil. Suitable oils for inclusion in the non-aqueous base fluid may include one or more crude oils or crude oil derivatives, such as one or more of gasoline, diesel, kerosene, bunker fuel, jet fuel, naphtha, and mineral oil. In embodiments, the continuous non-aqueous phase may include a synthetic oil. As used in the present disclosure, the term "synthetic oil" refers to crude oil derivatives that have been chemically treated, altered, or refined to enhance certain chemical or physical properties. While crude oil derivatives may typically encompass several classes (for example, alkane, aromatic, sulfur-bearing, or nitrogen-bearing) of thousands of individual compounds, a synthetic oil may include one class of only tens of individual compounds (for example, ester compounds in a $C_{8-14}$ range). Suitable synthetic oils may include linear alpha olefins, isomerized olefins, poly alpha olefins, linear alkyl benzenes, vegetable and hydrocarbon-derived ester compounds, or combinations of these.

The invert-emulsion drilling fluids of the present disclosure may include the dispersed aqueous phase such that the aqueous base fluid is present in the invert-emulsion drilling fluid in an amount of from 5 wt. % to 40 wt. %, based on the total weight of the invert-emulsion drilling fluid. In embodiments, the invert-emulsion drilling fluid may include the aqueous base fluid in an amount of from 5 wt. % to 35 wt. %, from 5 wt. % to 30 wt. %, from 5 wt. % to 25 wt. %, from 5 wt. % to 20 wt. %, from 10 wt. % to 40 wt. %, from 10 wt. % to 35 wt. %, from 10 wt. % to 30 wt. %, from 10 wt. % to 25 wt. %, from 10 wt. % to 20 wt. %, or from 12.5 wt. % to 17.5 wt. %, based on the total weight of the invert-emulsion drilling fluid.

The invert-emulsion drilling fluids of the present disclosure may include the continuous non-aqueous phase such that the non-aqueous base fluid is present in the invert-emulsion drilling fluid in an amount of from 10 wt. % to 60 wt. %, based on the total weight of the invert-emulsion drilling fluid. In embodiments, the invert-emulsion drilling fluid may include the non-aqueous base fluid in an amount of from 10 wt. % to 50 wt. %, from 10 wt. % to 40 wt. %, from 10 wt. % to 30 wt. %, from 15 wt. % to 60 wt. %, from 15 wt. % to 50 wt. %, from 15 wt. % to 40 wt. %, from 15 wt. % to 30 wt. %, from 20 wt. % to 60 wt. %, from 20 wt. % to 50 wt. %, from 20 wt. % to 40 wt. %, from 20 wt. % to 30 wt. %, from 25 wt. % to 60 wt. %, from 25 wt. % to 50 wt. %, from 25 wt. % to 40 wt. %, or from 25 wt. % to 30 wt. %, based on the total weight of the invert-emulsion drilling fluid.

As previously stated, the invert-emulsion drilling fluids of the present disclosure may include a bridging package. As used in the present disclosure, the term "bridging material" refers to solid materials added to an invert-emulsion drilling fluid that are suitable to bridge across fractures in a subterranean formation, thereby preventing loss of the invert-emulsion drilling fluid during drilling operations. Conventional bridging materials include calcium carbonate, suspended salt, oil-soluble resins, mica, nutshells, and fibers. Multiple bridging materials may be combined into a "bridging package," which may be desirable when trying to prevent loss of the invert-emulsion drilling fluid during drilling operations in highly fractured subterranean formations. In some embodiments, multiple bridging packages may be present in the invert-emulsion drilling fluids of the present disclosure.

The bridging packages described herein may be referred to as "multimodal," meaning that they include at least two peaks in their particle size distribution profile. In embodiments, the bridging packages described herein may include two peaks ("bimodal"), three peaks ("trimodal"), or more than three peaks in their particle size distribution profile. Without being bound by theory it is believed that such multimodal bridging packages are capable tightly packing (in other words, bridging) subterranean formations, even when the bridging packages are present in the invert-emulsion drilling fluid in relatively low concentrations.

In particular, the invert-emulsion drilling fluids may include a first bridging package consisting of one or more particulate carbonate materials. The first bridging package may have a trimodal particle size distribution such that the particle size distribution of the first bridging package comprises three peaks, where each peak is in the range of less than or equal to 300 microns in the particle size distribution. In one or more embodiments, all particulate carbonate materials of the invert-emulsion drilling fluid are part of the first bridging package. Suitable particulate carbonate materials may include, without limitation, aluminum carbonate, ammonium carbonate, barium carbonate, calcium carbonate, cerium carbonate, cesium carbonate, chromium carbonate, cobalt carbonate, copper carbonate, dolomite, iron carbonate, magnesium carbonate, manganese carbonate, nickel carbonate, potassium carbonate, silver carbonate, sodium carbonate, sodium carbonate decahydrate, tin carbonate, titanium carbonate, zinc carbonate, or combinations of these. In one or more embodiments, the one or more particulate carbonate materials include calcium carbonate. In embodiments, the one or more particulate carbonate materials may have a generally non-spherical shape.

The invert-emulsion drilling fluids of the present disclosure may include the first bridging package in an amount of from 2 wt. % to 20 wt. %, based on the total weight of the invert-emulsion drilling fluid. In embodiments, the invert-emulsion drilling fluid may include the first bridging package in an amount of from 2 wt. % to 18 wt. %, from 2 wt. % to 16 wt. %, from 2 wt. % to 14 wt. %, from 2 wt. % to 12 wt. %, from 2 wt. % to 10 wt. %, from 3 wt. % to 20 wt. %, from 3 wt. % to 18 wt. %, from 3 wt. % to 16 wt. %, from 3 wt. % to 14 wt. %, from 3 wt. % to 12 wt. %, from 3 wt. % to 10 wt. %, from 4 wt. % to 20 wt. %, from 4 wt. % to 18 wt. %, from 4 wt. % to 16 wt. %, from 4 wt. % to 14 wt. %, from 4 wt. % to 12 wt. %, from 4 wt. % to 10 wt. %, from 5 wt. % to 20 wt. %, from 5 wt. % to 18 wt. %, from 5 wt. % to 16 wt. %, from 5 wt. % to 14 wt. %, from 5 wt. % to 12 wt. %, or from 5 wt. % to 10 wt. %, based on the total weight of the invert-emulsion drilling fluid.

In reference to the described particle size distribution, FIG. 1 schematically depicts a sample particle size distribution 100. FIG. 1 depicts, generally, several features of the particle size distribution profiles of the presently described first bridging package, such as a first portion of particulate carbonate materials, a second portion of particulate carbonate materials, and a third portion of particulate carbonate materials, which are discussed in detail herein. As such, FIG. 1 can be used as a reference with respect to the disclosures related to the size distribution profiles of the first bridging package provided herein.

Specifically, the first portion of particulate carbonate materials 102, the second portion of particulate carbonate materials 104, and the third portion of particulate carbonate materials 106 are depicted. The first portion of particulate carbonate materials 102 has a peak 112, the second portion of particulate carbonate materials 104 has a peak 114, and the third portion of particulate carbonate materials 106 has a peak 116. It should be understood that the profile of FIG. 1 is not derived from experimentation or observation, but is instead supplied for informational purposes of describing particular features of a particle size distribution profile of the first bridging package.

In one or more embodiments, one or more of the first portion of particulate carbonate materials, the second portion of particulate carbonate materials, and the third portion of particulate carbonate materials may have a single peak. As used herein, a "single peak" refers to a particle size distribution profile where a particular portion includes only one, singular peak. That is, in some embodiments, the particle size distribution profile of one or more of the first portion of particulate carbonate materials, the second portion of particulate carbonate materials, and the third portion of particulate carbonate materials includes only an upward sloping region followed by a downward sloping region to form the single peak.

Figure 2:
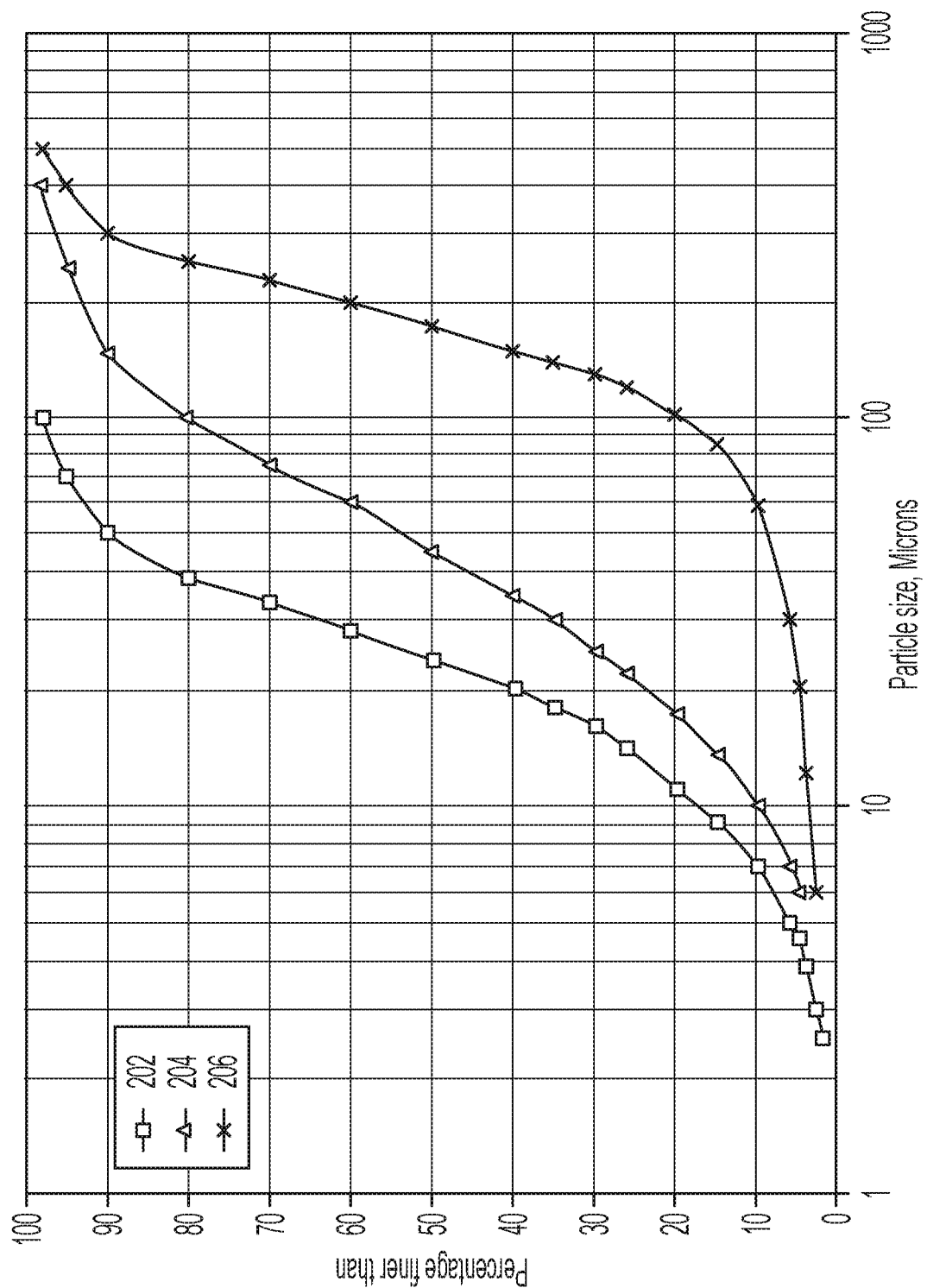
FIG. 2 graphically depicts a nominal median particle size of particulate carbonate materials, according to one or more embodiments presently presented.

It should be understood that a peak in one or more of the first portion of particulate carbonate materials, the second portion of particulate carbonate materials, and the third portion of particulate carbonate materials may not be formed by a local minimum in the respective portion at a defined nominal size boundary. That is, the peak must be a peak in the context of the entire spectrum, not a peak formed by the threshold nominal size of a portion of particulate carbonate materials. For example, if a single peak followed by a single valley were present in a portion of particulate carbonate materials (an upward slope followed by a downward slope followed by an upward slope), only a single peak would be present in such a portion. FIG. 2 generally depicts the nominal median particle size of each of the first portion of particulate carbonate materials 202, the second portion of particulate carbonate materials 204, and the third portion of particulate carbonate materials 206 present in one or more embodiments of the first bridging package In embodiments, the first portion of particulate carbonate materials 102 may have at least one peak 112 in the particle size distribution profile from 20 microns to 30 microns (such as the commercially available BARACARB® 25 from Halliburton). In one or more embodiments, the first bridging package may include at least 15 wt. % of the first portion of particulate carbonate materials, based on the total weight of the first bridging package. Accordingly, the first bridging package may include the first portion of particulate carbonate materials in an amount of from 15 wt. % to 40 wt. %, such as from 15 wt. % to 39 wt. %, from 15 wt. % to 38 wt. %, from 15 wt. % to 37 wt. %, from 15 wt. % to 36 wt. %, from 15 wt. % to 35 wt. %, from 20 wt. % to 40 wt. %, from 20 wt. % to 39 wt. %, from 20 wt. % to 38 wt. %, from 20 wt. % to 37 wt. %, from 20 wt. % to 36 wt. %, from 20 wt. % to 35 wt. %, from 25 wt. % to 40 wt. %, from 25 wt. % to 39 wt. %, from 25 wt. % to 38 wt. %, from 25 wt. % to 37 wt. %, from 25 wt. % to 36 wt. %, or from 25 wt. % to 35 wt. %, based on the total weight of the first bridging package.

In embodiments, the second portion of particulate carbonate materials 104 may have at least one peak 114 in the particle size distribution profile from 40 microns to 60 microns (such as the commercially available BARACARB® 50 from Halliburton). In one or more embodiments, the first bridging package may include at least 30 wt. % of the second portion of particulate carbonate materials, based on the total weight of the first bridging package. Accordingly, the first bridging package may include the second portion of particulate carbonate materials in an amount of from 30 wt. % to 80 wt. %, such as from 30 wt. % to 75 wt. %, from 30 wt. % to 70 wt. %, from 30 wt. % to 65 wt. %, from 35 wt. % to 80 wt. %, from 35 wt. % to 75 wt. %, from 35 wt. % to 70 wt. %, from 35 wt. % to 65 wt. %, from 40 wt. % to 80 wt. %, from 40 wt. % to 75 wt. %, from 40 wt. % to 70 wt. %, from 40 wt. % to 65 wt. %, from 45 wt. % to 80 wt. %, from 45 wt. % to 75 wt. %, from 45 wt. % to 70 wt. %, from 45 wt. % to 65 wt. %, from 50 wt. % to 80 wt. %, from 50 wt. % to 75 wt. %, from 50 wt. % to 70 wt. %, from 50 wt. % to 65 wt. %, from 55 wt. % to 80 wt. %, from 55 wt. % to 75 wt. %, from 55 wt. % to 70 wt. %, or from 55 wt. % to 65 wt. %, based on the total weight of the first bridging package.

In embodiments, the third portion of particulate carbonate materials 106 may have at least one peak 116 in the particle size distribution profile from 125 microns to 175 microns (such as the commercially available BARACARB® 150 from Halliburton). In one or more embodiments, the first bridging package may include at least 5 wt. % of the third portion of particulate carbonate materials, based on the total weight of the first bridging package. Accordingly, the first bridging package may include the third portion of particulate carbonate materials in an amount of from 5 wt. % to 20 wt. %, such as from 5 wt. % to 19 wt. %, from 5 wt. % to 18 wt. %, from 5 wt. % to 17 wt. %, from 5 wt. % to 15 wt. %, from 6 wt. % to 20 wt. %, from 6 wt. % to 19 wt. %, from 6 wt. % to 18 wt. %, from 6 wt. % to 17 wt. %, from 6 wt. % to 16 wt. %, from 6 wt. % to 15 wt. %, from 7 wt. % to 20 wt. %, from 7 wt. % to 19 wt. %, from 7 wt. % to 18 wt. %, from 7 wt. % to 17 wt. %, from 7 wt. % to 16 wt. %, from 7 wt. % to 15 wt. %, from 8 wt. % to 20 wt. %, from 8 wt. % to 19 wt. %, from 8 wt. % to 18 wt. %, from 8 wt. % to 17 wt. %, from 8 wt. % to 16 wt. %, from 8 wt. % to 15 wt. %, from 9 wt. % to 20 wt. %, from 9 wt. % to 19 wt. %, from 9 wt. % to 18 wt. %, from 9 wt. % to 17 wt. %, from 9 wt. % to 16 wt. %, from 9 wt. % to 15 wt. %, from 10 wt. % to 20 wt. %, from 10 wt. % to 19 wt. %, from 10 wt. % to 18 wt. %, from 10 wt. % to 17 wt. %, from 10 wt. % to 16 wt. %, or from 10 wt. % to 15 wt. %, based on the total weight of the first bridging package.

It should be understood that two or more portions of the particulate carbonate materials may overlap with one another. An example embodiment is depicted in FIG. 2, showing three overlapping particulate portions.

In some embodiments, the first bridging package may include at least 35 wt. % of a combination of the first portion of particulate carbonate materials, the second portion of particulate carbonate materials, and the third portion of particulate carbonate materials, based on the total weight of the first bridging package. Accordingly, the first bridging package may include a combination of the first portion of particulate carbonate materials, the second portion of particulate carbonate materials, and the third portion of particulate carbonate materials in an amount of from 35 wt. % to 90 wt. %, from 35 wt. % to 80 wt. %, from 35 wt. % to 70 wt. %, from 40 wt. % to 90 wt. %, from 40 wt. % to 80 wt. %, or from 40 wt. % to 70 wt. %, based on the total weight of the first bridging package.

In one or more embodiments, the use of a multimodal bridging package, such as a trimodal bridging package, may contribute to one or more of improved rheology resulting in reduced equivalent circulating density, improved sag resistance, and/or improved ability in plugging high permeability formations. Without being bound by any particular theory, it is believed that the multimodal size distribution contributes to these improvements by enhancing plugging in permeable formations. The smaller particulates in the multimodal bridging package may fill the space between the larger particulates, thereby creating a tighter seal. Moreover, the multimodal bridging package, according to embodiments, may include an amount of larger particles to rapidly bridge the fracture upon initial contact.

As previously stated, the invert-emulsion drilling fluids of the present disclosure may include a weighting agent. Weighting agents may include finely divided solid particles that may be dispersed in the invert-emulsion fluid. Weighting agents may increase the density of the invert-emulsion drilling fluid to support the sidewalls of the wellbore. Weighting agents may also increase the hydrostatic pressure of the invert-emulsion drilling fluid to reduce or prevent fluids present in the subterranean formation from flowing into the wellbore. Suitable weighting agents may include acid-soluble weighting agents, such as manganese tetroxide ($Mn_3O_4$), siderite, and ilmenite. In one or more embodiments, the weighting agent may include from 60 wt. % to 100 wt. % $Mn_3O_4$ (such as the commercially available MICROMAX® from Halliburton), based on the total weight of the weighting agent. Accordingly, the weighting agent may include from 65 wt. % to 100 wt. % $Mn_3O_4$, from 70 wt. % to 100 wt. % $Mn_3O_4$, from 75 wt. % to 100 wt. % $Mn_3O_4$, from 80 wt. % to 100 wt. % $Mn_3O_4$, from 85 wt. % to 100 wt. % $Mn_3O_4$, from 90 wt. % to 100 wt. % $Mn_3O_4$, or from 95 wt. % to 100 wt. % $Mn_3O_4$.

One common problem with typical weighting agents is barite sag, in which the weighting agent settles (or sags) in a circulating invert-emulsion drilling fluid utilized in a subterranean formation. If settling is prolonged, the upper portion of the wellbore may lose invert-emulsion drilling fluid density, which lessens the hydrostatic pressure in the subterranean formation, such that an influx of other fluids may enter the wellbore. The specific gravity of the weighting agent may influence factors causing barite sag, such as the plastic viscosity and the equivalent circulating density of the invert-emulsion drilling fluid. Plastic viscosity (PV) represents the viscosity of the invert-emulsion drilling fluid when extrapolated to infinite shear rate. A low PV indicates that the invert-emulsion drilling fluid is capable of drilling rapidly because of the low viscosity of invert-emulsion drilling fluid exiting at the drill pipe. The equivalent circulating density (ECD) represents the effective density exerted by the invert-emulsion drilling fluid against the subterranean formation. A low ECD indicates lower loss of the invert-emulsion drilling fluid during drilling operations. As the specific gravity of the weighting agent increases, the PV and the ECD of the invert-emulsion drilling fluid decreases, thereby decreasing the effects of barite sag. Accordingly, the weighting agent may have a specific gravity of greater than 4.2, such as greater than 4.3, greater than 4.4, greater than 4.5, greater than 4.6, or greater than 4.7. In addition, the weighting agent may include barite in an amount of less than 1 wt. %, such as less than 0.5 wt. %, 0.1 wt. %, 0.01 wt. %, 0.001 wt. %, 0.0001 wt. %, 0.00001 wt. %, or less than 0.000001 wt. %, based on the total weight of the weighting agent.

In embodiments, the invert-emulsion drilling fluids may include a weighting agent in an amount sufficient for the invert-emulsion drilling fluid to achieve a density of from 50 pounds per cubic foot (pcf) to 165 pcf, as measured in accordance with the American Petroleum Institute (API) recommended practice 13B-1. For example, the invert-emulsion drilling fluid may include a weighting agent in an amount sufficient for the invert-emulsion drilling fluid to achieve a density of from 50 pcf to 160 pcf, from 60 pcf to 150 pcf, from 60 pcf to 125 pcf, from 70 pcf to 150 pcf, from 70 pcf to 125 pcf, from 75 pcf to 150 pcf, from 75 pcf to 125 pcf, or from 80 pcf to 150 pcf, from 80 pcf to 125 pcf, from 90 pcf to 150 pcf, or from 90 pcf to 125 pcf.

In one or more embodiments, the invert-emulsion drilling fluid may include the weighting agent in an amount of from 10 pounds per barrel (ppb) to 800 ppb. For example, the invert-emulsion drilling fluid may include a weighting agent in an amount of from 20 ppb to 775 ppb, from 30 ppb to 750 ppb, from 40 ppb to 725 ppb, from 50 ppb to 700 ppb, from 60 ppb to 675 ppb, from 70 ppb to 650 ppb, from 80 ppb to 625 ppb, from 90 ppb to 600 ppb, from 100 ppb to 575 ppb, from 125 ppb to 550 ppb, from 150 ppb to 525 ppb, from 175 ppb to 500 ppb, from 200 ppb to 475 ppb, from 225 ppb to 450 ppb, or from 250 ppb to 425 ppb.

As previously stated, the invert-emulsion drilling fluid may include a second bridging package in order to further prevent lost circulation of the invert-emulsion drilling fluid during drilling operations in a subterranean formation. The second bridging package may include one or more graphite materials, where the second bridging package includes a first portion of particulate graphite materials and a second portion of particulate graphite materials. In one or more embodiments, all particulate graphite materials of the invert-emulsion drilling fluid are part of the second bridging package. In embodiments, the one or more graphite materials may have a bimodal particle size distribution such that the particle size distribution of the one or more graphite materials comprises two peaks. In certain embodiments, the one or more graphite materials may have a generally spherical shape. Without being bound by theory, it is believed that embodiments of the invert-emulsion drilling fluid that include both the generally spherical graphite materials and the generally non-spherical particulate carbonate materials may enhance the fluid's sealing properties, thereby preventing fluid loss and minimizing the chances of differential stuck pipe in a wellbore.

The invert-emulsion drilling fluids of the present disclosure may include the second bridging package in an amount of from 1 wt. % to 5 wt. %, based on the total weight of the invert-emulsion drilling fluid. In embodiments, the invert-emulsion drilling fluid may include the second bridging package in an amount of from 1 wt. % to 4 wt. %, from 1 wt. % to 3 wt. %, from 1 wt. % to 2 wt. %, from 1.25 wt. % to 5 wt. %, from 1.25 wt. % to 4 wt. %, from 1.25 wt. % to 3 wt. %, from 1.25 wt. % to 2 wt. %, from 1.5 wt. % to 5 wt. %, from 1.5 wt. % to 4 wt. %, from 1.5 wt. % to 3 wt. %, or from 1.5 wt. % to 2 wt. %, based on the total weight of the invert-emulsion drilling fluid.

In embodiments, the first portion of particulate graphite materials in the second bridging package may have at least one peak in the particle size distribution profile of from 40 microns to 60 microns (such as the commercially available STEELSEAL® 50 from Halliburton). In one or more embodiments, the second bridging package may include at least 15 wt. % of the first portion of particulate graphite materials, based on the total weight of the second bridging package. Accordingly, the second bridging package may include the first portion of particulate graphite materials in an amount of from 15 wt. % to 40 wt. %, such as from 15 wt. % to 39 wt. %, from 15 wt. % to 38 wt. %, from 15 wt. % to 37 wt. %, from 15 wt. % to 36 wt. %, from 15 wt. % to 35 wt. %, from 20 wt. % to 40 wt. %, from 20 wt. % to 39 wt. %, from 20 wt. % to 38 wt. %, from 20 wt. % to 37 wt. %, from 20 wt. % to 36 wt. %, from 20 wt. % to 35 wt. %, from 25 wt. % to 40 wt. %, from 25 wt. % to 39 wt. %, from 25 wt. % to 38 wt. %, from 25 wt. % to 37 wt. %, from 25 wt. % to 36 wt. %, or from 25 wt. % to 35 wt. %, based on the total weight of the second bridging package.

In embodiments, the second portion of particulate graphite materials in the second bridging package may have at least one peak in the particle size distribution profile of 75 microns to 125 microns (such as the commercially available STEELSEAL® 100 from Halliburton). In one or more embodiments, the second bridging package may include at least 15 wt. % of the second portion of particulate graphite materials, based on the total weight of the second bridging package. Accordingly, the second bridging package may include the second portion of particulate graphite materials in an amount of from 15 wt. % to 40 wt. %, such as from 15 wt. % to 39 wt. %, from 15 wt. % to 38 wt. %, from 15 wt. % to 37 wt. %, from 15 wt. % to 36 wt. %, from 15 wt. % to 35 wt. %, from 20 wt. % to 40 wt. %, from 20 wt. % to 39 wt. %, from 20 wt. % to 38 wt. %, from 20 wt. % to 37 wt. %, from 20 wt. % to 36 wt. %, from 20 wt. % to 35 wt. %, from 25 wt. % to 40 wt. %, from 25 wt. % to 39 wt. %, from 25 wt. % to 38 wt. %, from 25 wt. % to 37 wt. %, from 25 wt. % to 36 wt. %, or from 25 wt. % to 35 wt. %, based on the total weight of the second bridging package.

In one or more embodiments, the second bridging package may further include particulate cellulose fiber materials (such as the commercially available BAROFIBRE® SUPERFINE from Halliburton), which may seal microfractures in a subterranean formation. In one or more embodiments, the second bridging package may include at least 15 wt. % of the particulate cellulose fiber materials, based on the total weight of the second bridging package. Accordingly, the second bridging package may include the particulate cellulose fiber materials in an amount of from 15 wt. % to 40 wt. %, such as from 15 wt. % to 39 wt. %, from 15 wt. % to 38 wt. %, from 15 wt. % to 37 wt. %, from 15 wt. % to 36 wt. %, from 15 wt. % to 35 wt. %, from 20 wt. % to 40 wt. %, from 20 wt. % to 39 wt. %, from 20 wt. % to 38 wt. %, from 20 wt. % to 37 wt. %, from 20 wt. % to 36 wt. %, from 20 wt. % to 35 wt. %, from 25 wt. % to 40 wt. %, from 25 wt. % to 39 wt. %, from 25 wt. % to 38 wt. %, from 25 wt. % to 37 wt. %, from 25 wt. % to 36 wt. %, or from 25 wt. % to 35 wt. %, based on the total weight of the second bridging package. In one or more embodiments, all particulate cellulose fiber materials of the invert-emulsion drilling fluid are part of the second bridging package.

In embodiments, the second bridging package may include a combination of the first portion of particulate graphite materials, the second portion of particulate graphite materials, and the particulate cellulose fiber materials in an amount of from 35 wt. % to 90 wt. %, from 35 wt. % to 80 wt. %, from 35 wt. % to 70 wt. %, from 40 wt. % to 90 wt. %, from 40 wt. % to 80 wt. %, or from 40 wt. % to 70 wt. %, based on the total weight of the second bridging package.

The invert-emulsion drilling fluids of the present disclosure may be formulated to have specific characteristics, such as increased viscosity and density. For example, the invert-emulsion drilling fluids may be formulated to have a density in a range suitable to provide the necessary hydrostatic pressure to support the sidewalls of the wellbore and prevent fluids in the formation from flowing into the wellbore. Additionally, the invert-emulsion drilling fluids may be formulated to have viscosity in a range suitable to allow the invert-emulsion drilling fluids to be pumped down through the drill string while still capturing and conveying cuttings from the bottom of the subterranean formation. To accomplish these functions, the invert-emulsion drilling fluids may include one or more additives that are suitable for use in drilling fluids. The one or more additives may include emulsifiers, alkalinity adjusters, viscosifiers, shale inhibitors, wetting agents, filtrate control agents, or combinations of these.

In embodiments, the invert-emulsion drilling fluid may include the one or more additives in an amount of from 1 ppb to 100 ppb. For example, the invert-emulsion drilling fluid may include one or more additives in an amount of from 1 ppb to 95 ppb, from 1 ppb to 90 ppb, from 1 ppb to 85 ppb, from 1 ppb to 80 ppb, from 1 ppb to 75 ppb, from 1 ppb to 70 ppb, from 1 ppb to 65 ppb, from 1 ppb to 60 ppb, from 1 ppb to 55 ppb, from 1 ppb to 50 ppb, from 1 ppb to 45 ppb, from 1 ppb to 40 ppb, from 1 ppb to 30 ppb, from 1 ppb to 25 ppb, from 5 ppb to 100 ppb, from 10 ppb to 100 ppb, from 15 ppb to 100 ppb, from 20 ppb to 100 ppb, from 25 ppb to 100 ppb, from 30 ppb to 100 ppb, from 35 ppb to 100 ppb, from 40 ppb to 100 ppb, from 45 ppb to 100 ppb, from 50 ppb to 100 ppb, from 55 ppb to 100 ppb, from 60 ppb to 100 ppb, from 65 ppb to 100 ppb, from 70 ppb to 100 ppb, from 75 ppb to 100 ppb, from 5 ppb to 95 ppb, from 10 ppb to 90 ppb, from 15 ppb to 85 ppb, from 20 ppb to 80 ppb, from 25 ppb to 75 ppb, from 30 ppb to 70 ppb, from 35 ppb to 65 ppb, from 40 ppb to 60 ppb, or from 45 ppb to 55 ppb.

As previously stated, the invert-emulsion drilling fluids of the present disclosure may include an emulsifier. As used in the present disclosure, the term "emulsifier" refers to any compound suitable to facilitate the formation of an emulsion and reduce the interfacial tension between the dispersed phase and the continuous phase of the emulsion. Suitable emulsifiers include one or more of surfactants, detergents, lignosulfonates, lignitic compounds, polyaminated fatty acids, and materials derived from tall oil fatty acids. In embodiments, the emulsifier of the invert-emulsion drilling fluid of the present disclosure generally includes a polyaminated fatty acid (such as the commercially available LE SUPERMUL™ from Halliburton).

The invert-emulsion drilling fluids of the present disclosure may include the emulsifier in an amount sufficient to facilitate the formation of an emulsion. In embodiments, the invert-emulsion drilling fluids of the present disclosure may include an emulsifier in an amount of from 1 ppb to 30 ppb. For example, the invert-emulsion drilling fluids of the present disclosure may include an emulsifier in an amount of from 2 ppb to 28 ppb, from 4 ppb to 26 ppb, from 5 ppb to 25 ppb, from 6 ppb to 24 ppb, from 8 ppb to 22 ppb, from 10 ppb to 20 ppb, from 12 ppb to 18 ppb, or from 14 ppb to 16 ppb.

As previously stated, the invert-emulsion drilling fluid of the present disclosure may include an alkalinity adjuster. Alkalinity adjusters may include alkaline compounds that may be included in drilling fluids to buffer the pH of the invert-emulsion drilling fluid. Alkalinity adjusters may react with gases, such as carbon dioxide or hydrogen sulfide, encountered by the invert-emulsion drilling fluid during drilling operations to prevent the gases from hydrolyzing components of the invert-emulsion drilling fluid. Suitable alkalinity adjusters may include lime (calcium hydroxide or calcium oxide), soda ash (sodium carbonate), sodium hydroxide, potassium hydroxide, or combinations of these. In embodiments, the alkalinity adjuster of the invert-emulsion drilling fluids of the present disclosure generally includes lime.

The invert-emulsion drilling fluid may include an alkalinity adjuster in an amount sufficient to adjust the pH of the invert-emulsion drilling fluid to a desired level. In embodiments, the invert-emulsion drilling fluid may include an alkalinity adjuster in an amount of from 1 ppb to 20 ppb, based on the total weight of the invert-emulsion drilling fluid. For example, the invert-emulsion drilling fluid may include an alkalinity adjuster in an amount of from 1 ppb to 19 ppb, from 1 ppb to 18 ppb, from 1 ppb to 17 ppb, from 1 ppb to 16 ppb, from 1 ppb to 15 ppb, from 1 ppb to 14 ppb, from 1 ppb to 13 ppb, from 1 ppb to 12 ppb, from 1 ppb to 11 ppb, from 1 ppb to 10 ppb, from 1 ppb to 9 ppb, from 1 ppb to 8 ppb, from 1 ppb to 7 ppb, from 1 ppb to 6 ppb, from 1 ppb to 5 ppb, from 1 ppb to 4 ppb, or from 1 ppb to 3 ppb.

As stated previously, the invert-emulsion drilling fluid of the present disclosure may include a viscosifier, also referred to as a rheology modifier. Viscosifiers may impart non-Newtonian fluid rheology to the invert-emulsion drilling fluid, create a flat viscosity profile of the invert-emulsion drilling fluid in annular flow, or both. These properties may facilitate the lifting and conveying of cuttings from the bottom of the subterranean formation to the surface of the subterranean formation during drilling of the subterranean well. Suitable viscosifiers may include modified fatty acids, sepiolite, polysaccharides, bentonite, polyacrylamides, polyanionic cellulose, or combinations of these. In embodiments, the viscosifier may include a combination of sepiolite (such as the commercially available TAU-MOD® from Halliburton) and a modified fatty acid (such as the commercially available RHEMOD™ L from Halliburton).

The invert-emulsion drilling fluid may include a viscosifier in an amount sufficient to impart non-Newtonian fluid rheology to the invert-emulsion drilling fluid, create a flat viscosity profile of the invert-emulsion drilling fluid in annular flow, or both. In embodiments, the invert-emulsion drilling fluid may include the viscosifier in an amount of from 0.5 ppb to 20 ppb. For example, the invert-emulsion drilling fluid may include a viscosifier in an amount of from 1 ppb to 19 ppb, from 1 ppb to 18 ppb, from 1 ppb to 17 ppb, from 1 ppb to 16 ppb, from 1 ppb to 15 ppb, from 1 ppb to 14 ppb, from 1 ppb to 13 ppb, from 1 ppb to 12 ppb, from 1 ppb to 11 ppb, from 1 ppb to 10 ppb, from 1 ppb to 9 ppb, from 1 ppb to 8 ppb, from 1 ppb to 7 ppb, from 1 ppb to 6 ppb, from 1 ppb to 5 ppb, from 1 ppb to 4 ppb, or from 1 ppb to 3 ppb.

As previously stated, the invert-emulsion drilling fluids of the present disclosure may include a shale inhibitor. Shale inhibitors, also referred to as swelling inhibitors, may prevent the swelling and hydration of water-sensitive subterranean formations, such as shale formations. Shale inhibitors may attach to the surface of the subterranean formation and lend stability to the subterranean formation exposed to the invert-emulsion drilling fluid as well as prevent cuttings from dispersing into finer particles. Suitable shale inhibitors may include sodium chloride, potassium chloride, potassium carbonate, potassium lignite, calcium chloride, sodium asphalt sulfonate, or combinations of these. In embodiments, the shale inhibitor of the invert-emulsion drilling fluids of the present disclosure may include calcium chloride.

As previously stated, the invert-emulsion drilling fluids of the present disclosure may include an oil wetting agent. Oil wetting agents may maintain the rheology of the invert-emulsion drilling fluid by lowering its surface tension while also improving its thermal stability. As a result, the oil wetting agent may allow the invert-emulsion drilling fluid to spread around the subterranean formation more quickly, thereby decreasing fluid loss within the wellbore. A suitable oil wetting agent may include liquid lecithin (such as the commercially available DRILTREAT® from Halliburton).

The invert-emulsion drilling fluid may include an oil wetting agent in an amount sufficient to reduce or prevent the leakage of the invert-emulsion drilling fluid into the subterranean formation. In embodiments, the invert-emulsion drilling fluid may include an oil wetting agent in an amount of from 0.1 ppb to 10 ppb. For example, the invert-emulsion drilling fluid may include a wetting agent in an amount of from 0.1 ppb to 9 ppb, from 0.1 ppb to 8 ppb, from 0.1 ppb to 7 ppb, from 0.1 ppb to 6 ppb, from 0.1 ppb to 5 ppb, from 0.1 ppb to 4 ppb, from 0.1 ppb to 3 ppb, from 0.1 ppb to 2 ppb, from 0.1 ppb to 1 ppb, or from 0.25 ppb to 0.75 ppb.

As stated previously, the invert-emulsion drilling fluids of the present disclosure may include a filtrate control agent. Filtrate control agents reduce the amount of invert-emulsion drilling fluid dispersing into the subterranean formation wall by tightening a filter cake. As a result, the filtrate control agent reduces the problems associated with subterranean formation contamination and improves wellbore stability. A suitable filtrate control agent may include a styrene acrylate copolymer (such as the commercially available BaraFLC® IE-513 from Halliburton).

The invert-emulsion drilling fluids may include a filtrate control agent in an amount sufficient to reduce or prevent the invert-emulsion drilling fluid from dispersing into the subterranean formation wall. In embodiments, the invert-emulsion drilling fluid may include a filtrate control agent in an amount of from 0.1 ppb to 20 ppb. For example, the invert-emulsion drilling fluid may include a wetting agent in an amount of from 1 ppb to 19 ppb, from 1 ppb to 18 ppb, from 1 ppb to 17 ppb, from 1 ppb to 16 ppb, from 1 ppb to 15 ppb, from 1 ppb to 14 ppb, from 1 ppb to 13 ppb, from 1 ppb to 12 ppb, from 1 ppb to 11 ppb, from 1 ppb to 10 ppb, from 2 ppb to 20 ppb, from 3 ppb to 20 ppb, from 4 ppb to 20 ppb, from 5 ppb to 20 ppb, from 2 ppb to 18 ppb, from 3 ppb to 17 ppb, from 4 ppb to 16 ppb, from 5 ppb to 15 ppb, from 5 ppb to 10 ppb, from 5 ppb to 9 ppb, from 5 ppb to 8 ppb, or from 5 ppb to 7 ppb.

The present disclosure is also directed to the use of the invert-emulsion drilling fluid in drilling operations, such as drilling a subterranean well. Accordingly, methods for reducing lost circulation in a subterranean formation during drilling operations may include operating a drill in a subterranean formation in the presence of the invert-emulsion drilling fluid. The invert-emulsion drilling fluid incorporated in this method may be in accordance with any of the embodiments previously described.

In embodiments, the invert-emulsion drilling fluid may be introduced into the subterranean formation. Introducing the invert-emulsion drilling fluid may include injecting the invert-emulsion drilling fluid drilling fluid into the subterranean formation. In embodiments, the invert-emulsion drilling fluid drilling fluid may be injected into the subterranean formation through a drill string of the drill to a drill bit. In one or more embodiments, the subterranean formation may be a subterranean well. In embodiments, the subterranean formation may be a shale formation. The invert-emulsion drilling fluid may at least be partially circulated within the subterranean formation. Recirculating the invert-emulsion drilling fluid may allow the invert-emulsion drilling fluid to cool and lubricate the drill bit and to lift cuttings away from the drill bit, thereby carrying the cuttings upwards to the surface to clean the wellbore. The invert-emulsion drilling fluid may additionally provide hydrostatic pressure to support the sidewalls of the wellbore and prevent the sidewalls from collapsing onto the drill string.

Examples

The various embodiments of present disclosure will be further clarified by the following examples. The examples are illustrative in nature, and should not be understood to limit the subject matter of the present disclosure.

To demonstrate the characteristics of the present embodiments, invert-emulsion drilling fluids were formulated in accordance with the present disclosure. A formulation for a 95 pcf invert-emulsion drilling fluid (Example 1) that included a first bridging package, such as those previously described, is shown below in Table 1.

TABLE 1

| Composition of Example 1 | |
|---|---|
| Component | Amount (lb/bbl) |
| Diesel | 146.4 |
| LE SUPERMUL ™ | 14 |
| Lime | 2.5 |
| RHEMOD ™ L | 0.5 |
| BaraFLC ® IE-513 | 6 |
| Tap Water | 81.9 |
| Calcium Chloride | 23.8 |
| TAU-MOD ® | 1.5 |
| Manganese Tetroxide ($Mn_3O_4$) | 215.4 |
| DRILTREAT ® | 0.5 |
| First Portion of Particulate Carbonate Materials | 11 |
| Second Portion of Particulate Carbonate Materials | 25 |
| Third Portion of Particulate Carbonate Materials | 4 |

In Table 1, "bbl" stands for barrels, equivalent to roughly 42 U.S. gallons or 159 liters. Likewise, "lb/bbl" stands for pounds per barrel (ppb). After hot rolling the invert-emulsion drilling fluid of Example 1 at 300 degrees Fahrenheit (° F.) for 16 hours, it was evaluated for its rheological properties using a Fann 35 viscometer and a Fann 75 viscometer. The results are shown below in Table 2.

TABLE 2

| Rheological Properties of Example 1 | | | | | | | | | | |
|---|---|---|---|---|---|---|---|---|---|---|
| | Fann 35 | | | | Fann 75 | | | | | |
| Temperature (° F.) | 150 | 150 | 150 | 150 | 267 | 267 | 311 | 311 | 331 | 331 |
| Pressure (psi) | 0 | 0 | 1954 | 3457 | 5059 | 7272 | 6628 | 8469 | 7617 | 9753 |
| Rheology (lb/100 ft$^2$) | | | | | | | | | | |
| 600 rpm | 74 | 74 | 88 | 98 | 53 | 61 | 49 | 54 | 48 | 55 |
| 300 rpm | 45 | 46 | 51 | 57 | 34 | 38 | 32 | 36 | 31 | 34 |

TABLE 2-continued

Rheological Properties of Example 1

| | Fann 35 | | | | Fann 75 | | | | | |
|---|---|---|---|---|---|---|---|---|---|---|
| Temperature (° F.) | 150 | 150 | 150 | 150 | 267 | 267 | 311 | 311 | 331 | 331 |
| 200 rpm | 33 | 36 | 40 | 42 | 27 | 30 | 25 | 28 | 25 | 28 |
| 100 rpm | 22 | 25 | 28 | 28 | 19 | 20 | 18 | 20 | 19 | 21 |
| 6 rpm | 8 | 9 | 10 | 9 | 7 | 7 | 7 | 7 | 8 | 7 |
| 3 rpm | 7 | 7 | 7 | 7 | 5 | 5 | 5 | 5 | 6 | 5 |
| PV (cp) | 29 | 28 | 37 | 41 | 19 | 23 | 17 | 18 | 17 | 21 |
| YP (lb/100 ft²) | 16 | 18 | 14 | 16 | 15 | 15 | 15 | 18 | 14 | 13 |

As shown in Table 2, the yield point (YP) and plastic viscosity (PV) values for the invert-emulsion drilling fluid of Example 1 remained consistent across a range of temperatures and pressures. The consistent PV and YP values indicate that the invert-emulsion drilling fluid of Example 1 is capable of removing cuttings produced during drilling operations and resisting barite sag, even under HTHP conditions (such as those used during Fann 75 testing). Moreover, the stable PV values indicate that the invert-emulsion drilling fluid of Example 1 has a low ECD impact on a subterranean formation at varying temperatures and pressures during drilling operations.

Next, the invert-emulsion drilling fluid of Example 1 was evaluated for its gel strength properties at 10 seconds, 10 minutes, and 30 minutes using a Fann 35 viscometer at 150° F. The results are shown below in Table 3.

TABLE 3

Gel Strength Properties of Example 1

| Time | Gel Strength (lb/100 ft²) |
|---|---|
| 10 seconds | 10 |
| 10 minutes | 12 |
| 30 minutes | 14 |

As shown in Table 3, the invert-emulsion fluid of Example 1 exhibited desired gel structure formation at 10 seconds and 10 minutes as indicated by the rapid increase in gel strength relative to the low shear value when compared to the Fann 35 reading at 3 rpm (see Table 2). The rapid increase in gel strength provides desired suspension characteristics when the fluid is static. Moreover, the 30 minute gel strength was 14 lb/100 ft², which indicated that there was not progressive gelling of the invert-emulsion fluid of Example 1. Progressive gelling is undesirable as increased pressure is required to break gel structures and initiate circulation of the invert-emulsion fluid within a subterranean formation.

Next, the invert-emulsion drilling fluid of Example 1 was evaluated for its fluid loss properties at 300° F. The results are shown below in Table 4.

TABLE 4

Fluid Loss Properties of Example 1

| Time | Fluid Loss (milliliters) |
|---|---|
| 30 minutes | 0.4 |
| 60 minutes | 0.8 |

As shown in Table 4, the invert-emulsion drilling fluid of Example 1 demonstrated little fluid loss at high temperatures, indicating that Example 1 has suitable sealing characteristics attributable to the bridging package. Moreover, as an all-oil filtrate was used, the results confirm adequate emulsification of the invert-emulsion drilling fluid of Example 1 and no compatibility issues between Example 1 and a subterranean formation.

The invert-emulsion drilling fluid of Example 1 was also static aged for both 24 hours and 48 hours in a vertical position at 300° F. Sag factors for both the 24-hour aged sample and the 48-hour aged sample were then calculated with the following equation:

$$\text{Sag Factor} = \frac{SG_{bottom}}{SG_{bottom} + SG_{top}}$$

where $SG_{bottom}$=the specific gravity at the bottom of the sample, and where $SG_{top}$=the specific gravity at the top of the sample.

Using this equation, it was calculated that the 24-hour aged sample of Example 1 had a sag factor of 0.507 while the 48-hour aged sample of Example 1 had a sag factor of 0.513. Based on these results, both of these samples may be considered to be sag resistant invert-emulsion drilling fluids as they fall within the specified range of 0.50 to 0.53. (Maxey, Jason. "Rheological Analysis of Static and Dynamic Sag in Drilling Fluids." *ANNUAL TRANSACTIONS OF THE NORDIC RHEOLOGY SOCIETY*, vol. 15, 2007). Moreover, each aged sample of the invert-emulsion drilling fluid of Example 1 produced no amount of free oil separation. In contrast, a typical barite drilling fluid without the bridging package was calculated to have a sag factor of 0.533, which is outside of the range of being considered a sag resistant fluid. The typical drilling fluid also produced 25 milliliters of free oil separation. As a result, the invert-emulsion drilling fluid of Example 1 may be considered to have excellent stability and minimal sag propensity.

The invert-emulsion drilling fluid of Example 1 was incorporated in the formation of sample filter cakes. As used herein, a "filter cake" is a layer of deposited solids and gelled drilling fluid that adheres to the interior surfaces of the wellbore, including the wellbore wall and the exterior of the fluid conduit. Filter cake properties such as cake thickness, toughness, slickness, and permeability are important because the cake that forms on permeable zones in the wellbore may cause stuck pipe and other drilling problems.

To build a filter cake, a dry ceramic disk was soaked in diesel for 10 minutes. The soaked ceramic disk was then placed in a closed cell, which was pressurized to 500 psi using nitrogen gas. During pressurization, the invert-emulsion drilling fluid of Example 1 was introduced to the closed cell, such that the soaked ceramic disk was coated with the invert-emulsion drilling fluid of Example 1 to form the filter cake. After 30 minutes, the closed cell was cooled and depressurized. The filter cake was removed and weighed in order to get a first filter cake weight. Moreover, the filter cake thickness was measured at this time as 0.8 mm, which is well below the maximum threshold of 2 mm. The thin filter cake thickness may suggest low contact area of the tubulars with the wellbore, thus reducing the risk of differential sticking typically associated with high angle intervals with high over balance The filter cake was then placed back into the cell. Then, 100 mL of a treatment wash, which is described below, was slowly poured onto the filter cake. The closed cell was then pressurized to 300 psi and the filter cake was soaked in the treatment wash for 24 hours. After the requisite length of time passed, the treated filter cake was removed and again weighed in order to get a second filter cake weight. The first filter cake weight and the second filter cake weight were then compared to each other in order to establish filter cake removal efficiency.

In a first filter cake test, a treatment wash comprising 141.8 mL water, 1 wt. % HCl, 9 mL formic acid, 10 mL mutual solvent, 0.2 mL surfactant (Losurf 259), 2.5 mL corrosion inhibitor (HAI-OS), 4 g dry intensifier (HII-124B), and 4 mL liquid intensifier (HII-24F) was used to remove the filter cake. This treatment wash resulted in a filter cake removal efficiency of 85%.

In a second filter cake test, a treatment wash comprising 141.8 mL water, 2 wt. % HCl, 11.2 mL formic acid, 10 mL mutual solvent, 0.2 mL surfactant (Losurf 259), 2.5 mL corrosion inhibitor (HAI-OS), 4 g dry intensifier (HII-124B), and 4 mL liquid intensifier (HII-24F) was used to remove the filter cake. This treatment wash resulted in a filter cake removal efficiency of 94.5%.

These high filter cake removal efficiencies are a result of the acid-soluble nature of the invert-emulsion drilling fluids disclosed in the present application, which is at least partially due to the fact that the invert-emulsion drilling fluids include $Mn_3O_4$ as a weighting agent instead of barite, which is not acid-soluble. These results further indicate that the invert-emulsion drilling fluids as described in the present application are suitable for drilling in wellbores that require acidizing.

Multiple formulations for 95 pcf invert-emulsion drilling fluids (Example 2-7) that include a first bridging package and a second bridging package, such as those previously described, are shown below in Table 5.

TABLE 5

Composition of Examples 2-7

| Component | Amount (lb/bbl) | | | | | |
|---|---|---|---|---|---|---|
| | Example 2 | Example 3 | Example 4 | Example 5 | Example 6 | Example 7 |
| Diesel | 146.4 | 142.1 | 142.1 | 142.1 | 145.3 | 146.1 |
| LE SUPERMUL ™ | 14 | 14 | 14 | 14 | 14 | 14 |
| Lime | 2.5 | 2.5 | 2.5 | 2.5 | 2.5 | 2.5 |
| RHEMOD ™ L | 0.5 | 1 | 0.5 | 0.7 | 0.5 | 0.5 |
| BaraFLC ® IE-513 | 6 | — | — | — | 5.5 | 6.5 |
| Tap Water | 81.9 | 79.8 | 79.8 | 79.8 | 81.6 | 81.9 |
| Calcium Chloride | 23.8 | 23.1 | 23.1 | 23.1 | 23.6 | 23.8 |
| TAU-MOD ® | 1.5 | 1.5 | 1 | 1.25 | 1.5 | 1.5 |
| Manganese Tetroxide ($Mn_3O_4$) | 215.4 | 187.2 | 187.2 | 187.2 | 207.9 | 215.3 |
| DRILTREAT ® | 0.5 | 0.5 | 0.5 | 0.5 | 0.5 | 0.5 |
| First Portion of Particulate Carbonate Materials | 9.5 | 18 | 18 | 18 | 11 | 9.5 |
| Second Portion of Particulate Carbonate Materials | 16.8 | 32 | 32 | 32 | 21 | 16.8 |
| Third Portion of Particulate Carbonate Materials | 4.2 | 8 | 8 | 8 | 5.3 | 4.2 |
| STEELSEAL ® 50 | 3.2 | 6 | 6 | 6 | 4 | 3.2 |
| STEELSEAL ® 100 | 3.2 | 6 | 6 | 6 | 4 | 3.2 |
| BAROFIBRE ® SUPERFINE | 3.2 | 6 | 6 | 6 | 4 | 3.2 |

After hot rolling the invert-emulsion drilling fluids of Example 2-7 at 300 degrees Fahrenheit (° F.) for 16 hours, each fluid was evaluated for its rheological properties using a Fann 35 viscometer at 150° F. and 0 psi. The results are shown below in Table 6.

TABLE 6

Rheological Properties of Example 2-7

| Property | Measurement (lb/ft²) | | | | | |
|---|---|---|---|---|---|---|
| | Example 2 | Example 3 | Example 4 | Example 5 | Example 6 | Example 7 |
| 600 rpm (lb/100 ft²) | 76 | 80 | 88 | 79 | 72 | 74 |
| 300 rpm (lb/100 ft²) | 49 | 51 | 54 | 50 | 44 | 45 |
| 200 rpm (lb/100 ft²) | 38 | 40 | 42 | 38 | 35 | 35 |

TABLE 6-continued

Rheological Properties of Example 2-7

| Property | Measurement (lb/ft²) | | | | | |
| --- | --- | --- | --- | --- | --- | --- |
| | Example 2 | Example 3 | Example 4 | Example 5 | Example 6 | Example 7 |
| 100 rpm (lb/100 ft²) | 26 | 27 | 29 | 26 | 24 | 23 |
| 6 rpm (lb/100 ft²) | 9 | 9 | 9 | 9 | 8 | 8 |
| 3 rpm (lb/100 ft²) | 8 | 8 | 8 | 7 | 7 | 7 |
| PV (cp) | 27 | 29 | 34 | 29 | 28 | 29 |
| YP (lb/100 ft²) | 22 | 22 | 20 | 21 | 16 | 16 |

As shown in Table 6, the YP and PV values for the invert-emulsion drilling fluids of Examples 2-7 were within the target specifications of less than 35 cp and less than 25 lb/100 ft², respectively. The PV and YP were comparable to those recorded for Example 1, and indicate that the invert-emulsion drilling fluids of Examples 2-7 have low ECD impacts on a subterranean formation during drilling operations. Moreover, the viscosities of Examples 2-7 all fell within the target specification of 8 lb/100 ft² to 10 lb/100 ft² at 6 rpm. These viscosities are desirable because values lower than 8 lb/100 ft² at 6 rpm may result in barite sag and lower cuttings disposal. In other words, the drilling fluids having a viscosity below 8 lb/100 ft² at 6 rpm may not have the capacity to suspend the weighting agent or cuttings in the borehole.

Next, the invert-emulsion drilling fluid of Examples 2-7 were evaluated for their gel strength properties at 10 seconds, 10 minutes, and 30 minutes using a Fann 35 viscometer at 150° F. The results are shown below in Table 7.

TABLE 7

Gel Strength Properties of Examples 2-7

| Time | Gel Strength (lb/100 ft²) | | | | | |
| --- | --- | --- | --- | --- | --- | --- |
| | Example 2 | Example 3 | Example 4 | Example 5 | Example 6 | Example 7 |
| 10 seconds | 11 | 12 | 10 | 10 | 10 | 9 |
| 10 minutes | 15 | 18 | 12 | 15 | 13 | 12 |
| 30 minutes | 16 | — | — | — | 15 | 13 |

As shown in Table 7, the invert-emulsion fluids of Examples 2-7 exhibited desired gel structure formation at 10 seconds and 10 minutes as indicated by the rapid increase in gel strength relative to the low shear value when compared to the Fann 35 reading at 3 rpm (see Table 6). The rapid increase in gel strength provides desired suspension characteristics when the fluid is static. Moreover, the 30 minute gel strengths for Examples 2, 6, and 7, invert-emulsion drilling fluids that include both bridging packages, indicated that no progressive gelling of such invert-emulsion fluids. As previously stated, progressive gelling is undesirable as increased pressure is required to break gel structures and initiate circulation of the invert-emulsion fluid within a subterranean formation.

Next, the invert-emulsion drilling fluid of Examples 2-7 were evaluated for their fluid loss properties at 300° F. The results are shown below in Table 8.

TABLE 8

Fluid Loss Properties of Examples 2-7

| Time | Fluid Loss (milliliters) | | | | | |
| --- | --- | --- | --- | --- | --- | --- |
| | Example 2 | Example 3 | Example 4 | Example 5 | Example 6 | Example 7 |
| 30 minutes | 0.4 | 0.4 | 0.2 | 1 | 0.6 | 0.4 |
| 60 minutes | 0.8 | 0.8 | 0.4 | 2 | 1.2 | 0.8 |

As shown in Table 8, the invert-emulsion drilling fluids of Examples 2-7 demonstrated little fluid loss at high temperatures, indicating that Examples 2-7 all have suitable sealing characteristics attributable to the one or more bridging package. Moreover, as an all-oil filtrate was used, the results confirm adequate emulsification of the invert-emulsion drilling fluids of Examples 2-7 and no compatibility issues between Examples 2-7 and a subterranean formation.

A formulation for a 115 pcf invert-emulsion drilling fluid (Example 8) that included a first bridging package and a second bridging package, such as those previously described, is shown below in Table 9.

TABLE 9

Composition of Example 8

| Component | Amount (lb/bbl) |
| --- | --- |
| Diesel | 179.2 |
| LE SUPERMUL ™ | 15 |
| Lime | 2.5 |
| RHEMOD ™ L | 0.3 |
| BaraFLC ® IE-513 | 6 |
| Tap Water | 44.8 |
| Calcium Chloride | 17.9 |
| TAU-MOD ® | 1.5 |
| Manganese Tetroxide ($Mn_3O_4$) | 333.9 |
| DRILTREAT ® | 0.5 |
| First Portion of Particulate Carbonate Materials | 18 |
| Second Portion of Particulate Carbonate Materials | 32 |
| Third Portion of Particulate Carbonate Materials | 8 |
| STEELSEAL ® 50 | 6 |
| STEELSEAL ® 100 | 6 |
| BAROFIBRE ® SUPERFINE | 6 |

After hot rolling the invert-emulsion drilling fluid of Example 8 at ° F. for 16 hours, it was evaluated for its rheological properties. The results are shown below in Table 10.

TABLE 10

Rheological Properties of Example 8

| Property | Measurement (lb/ft$^2$) |
| --- | --- |
| 600 rpm (lb/100 ft$^2$) | 88 |
| 300 rpm (lb/100 ft$^2$) | 53 |
| 200 rpm (lb/100 ft$^2$) | 40 |
| 100 rpm (lb/100 ft$^2$) | 27 |
| 6 rpm (lb/100 ft$^2$) | 9 |
| 3 rpm (lb/100 ft$^2$) | 8 |
| PV (cp) | 35 |
| YP (lb/100 ft$^2$) | 18 |

As shown in Table 10, the YP and PV values for the invert-emulsion drilling fluid of Example 8 was within the target specifications of less than 35 cp and less than 25 lb/100 ft$^2$, respectively. The PV and YP were comparable to those recorded for Examples 1-7, and indicate that the invert-emulsion drilling fluids of Example 8 has a low ECD impact on a subterranean formation during drilling operations. Moreover, the viscosity of Example 8 fell within the target specification of 8 lb/100 ft$^2$ to 10 lb/100 ft$^2$ at 6 rpm. Again, these viscosities are desirable because values lower than 8 lb/100 ft$^2$ at 6 rpm may result in barite sag and lower cuttings disposal. In other words, the drilling fluids having a viscosity below 8 lb/100 ft$^2$ at 6 rpm may not have the capacity to suspend the weighting agent or cuttings in the borehole.

Next, the invert-emulsion drilling fluid of Example 8 was evaluated for its gel strength properties at 10 seconds and 10 minutes using a Fann 35 viscometer at 150° F. The results are shown below in Table 3.

TABLE 11

Gel Strength Properties of Example 8

| Time | Gel Strength (lb/100 ft$^2$) |
| --- | --- |
| 10 seconds | 9 |
| 10 minutes | 13 |

As shown in Table 11, the invert-emulsion fluid of Example 8 exhibited desired gel structure formation at 10 seconds and 10 minutes as indicated by the rapid increase in gel strength relative to the low shear value when compared to the Fann 35 reading at 3 rpm (see Table 10). The rapid increase in gel strength provides desired suspension characteristics when the fluid is static.

Next, the invert-emulsion drilling fluid of Example 8 was evaluated for its fluid loss properties at 300° F. The results are shown below in Table 12.

TABLE 12

Fluid Loss Properties of Example 8

| Time | Fluid Loss (milliliters) |
| --- | --- |
| 30 minutes | 0.7 |
| 60 minutes | 1.4 |

As shown in Table 11, the invert-emulsion drilling fluid of Example 8 demonstrated little fluid loss at high temperatures, indicating that Example 8 has suitable sealing characteristics attributable to the bridging package. Moreover, as an all-oil filtrate was used, the results confirm adequate emulsification of the invert-emulsion drilling fluid of Example 8 and no compatibility issues between Example 8 and a subterranean formation It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims their equivalents.

It should now be understood that various aspects of the present disclosure are described and such aspects may be utilized in conjunction with various other aspects.

According to a first aspect of the present disclosure, an invert-emulsion drilling fluid may include a dispersed aqueous phase including an aqueous base fluid, a continuous non-aqueous phase including a non-aqueous base fluid, and a first bridging package. The first bridging package includes one or more particulate carbonate materials. All particulate carbonate materials of the invert-emulsion drilling fluid are a part of the first bridging package. The first bridging package has a trimodal particle size distribution such that the particle size distribution of the first bridging package includes three peaks, where each peak is in the range of less than or equal to 300 microns in the particle size distribution.

A second aspect of the present disclosure may include the first aspect, wherein the trimodal particle size distribution of the one or more particulate carbonate materials includes peaks in ranges of: from 20 microns to 30 microns, from 40 microns to 60 microns, and from 125 microns to 175 microns.

A third aspect of the present disclosure may include the first aspect or second aspect, wherein particulate carbonate materials having a nominal particle size of from 20 microns to 30 microns define a first portion of particulate carbonate materials, particulate carbonate materials having a nominal particle size of from 40 microns to 60 microns define a second portion of particulate carbonate materials, particulate carbonate materials having a nominal particle size of from 125 microns to 175 microns define a third portion of particulate carbonate materials, and the first bridging package includes at least 35 wt. % of a combination of the first portion of particulate carbonate materials, the second portion of particulate carbonate materials, and the third portion of particulate carbonate materials, based on the total weight of the first bridging package.

A fourth aspect of the present disclosure may include any of the first through third aspects, wherein the invert-emulsion drilling fluid includes from 2 wt. % to 20 wt. % of the first bridging package, based on the total weight of the invert-emulsion drilling fluid.

A fifth aspect of the present disclosure may include any of the first through fourth aspects, further including a weighting agent including from 60 wt. % to 100 wt. % manganese tetroxide ($Mn_3O_4$), based on the total weight of the weighting agent.

A sixth aspect of the present disclosure may include any of the first through fifth aspects, wherein the invert-emulsion drilling fluid includes from 10 ppb to 800 ppb of the weighting agent, based on the total weight of the invert-emulsion drilling fluid.

A seventh aspect of the present disclosure may include any of the first through sixth aspects, wherein the second bridging package includes one or more particulate graphite materials, all particulate graphite materials of the invert-emulsion drilling fluid are part of the second bridging package, and a particle size distribution of the one or more particulate graphite materials includes peaks in ranges of from: 40 microns to 60 microns and from 75 microns to 125 microns.

An eighth aspect of the present disclosure may include the seventh aspect, wherein the second bridging package further includes at least 15 wt. % of particulate cellulose fiber materials, based on the total weight of the second bridging package.

A ninth aspect of the present disclosure may include the seventh aspect or eighth aspect, wherein the invert-emulsion drilling fluid includes from 1 wt. % to 5 wt. % of the second bridging package, based on the total weight of the invert-emulsion drilling fluid.

According to a tenth aspect of the present disclosure, a method for reducing lost circulation in a subterranean formation during drilling operations, the method may include introducing an invert-emulsion drilling fluid into the subterranean formation. The invert-emulsion drilling fluid includes a dispersed aqueous phase including an aqueous base fluid; a continuous non-aqueous phase including a non-aqueous base fluid; and a first bridging package, wherein the first bridging package includes one or more particulate carbonate materials; all particulate carbonate materials of the invert-emulsion drilling fluid are part of the first bridging package; and the first bridging package has a trimodal particle size distribution such that the particle size distribution of the first bridging package includes three peaks, wherein each peak is in the range of less than or equal to 300 microns in the particle size distribution.

An eleventh aspect of the present disclosure may include the tenth aspect, wherein the trimodal particle size distribution of particulate carbonate materials includes peaks in ranges of from 20 microns to 30 microns, from 40 microns to 60 microns, and from 125 microns to 175 microns.

A twelfth aspect of the present disclosure may include the tenth aspect or the eleventh aspect, wherein particulate carbonate materials having a nominal particle size of from 20 microns to 30 microns define a first portion of particulate carbonate materials, particulate carbonate materials having a nominal particle size of from 40 microns to 60 microns define a second portion of particulate carbonate materials, particulate carbonate materials having a nominal particle size of from 125 microns to 175 microns define a third portion of particulate carbonate materials, and the first bridging package includes at least 35 wt. % of a combination of the first portion of particulate carbonate materials, the second portion of particulate carbonate materials, and the third portion of particulate carbonate materials, based on the total weight of the first bridging package.

A thirteenth aspect of the present disclosure may include any of the tenth through twelfth aspects, wherein the invert-emulsion drilling fluid includes from 2 wt. % to 20 wt. % of the first bridging package, based on the total weight of the invert-emulsion drilling fluid.

A fourteenth aspect of the present disclosure may include any of the tenth through thirteenth aspects, wherein the invert-emulsion drilling fluid further includes a weighting agent including from 60 wt. % to 100 wt. % manganese tetroxide ($Mn_3O_4$), based on the total weight of the weighting agent.

A fifteenth aspect of the present disclosure may include any of the tenth through fourteenth aspects, wherein the invert-emulsion drilling fluid includes from 10 ppb to 800 ppb of the weighting agent.

A sixteenth aspect of the present disclosure may include any of the tenth through fifteenth aspects, wherein the second bridging package includes one or more particulate graphite materials, all particulate graphite materials of the invert-emulsion drilling fluid are part of the second bridging package, and a particle size distribution of the one or more particulate graphite materials includes peaks in ranges of: from 40 microns to 60 microns and from 75 microns to 125 microns.

A seventh aspect of the present disclosure may include the sixteenth aspect, wherein the second bridging package further includes at least 15 wt. % of particulate cellulose fiber materials, based on the total weight of the second bridging package.

An eighteenth aspect of the present disclosure may include the sixteenth aspect or the seventeenth aspect, wherein the invert-emulsion drilling fluid includes from 1 wt. % to 5 wt. % of the second bridging package, based on the total weight of the invert-emulsion drilling fluid.

According to a nineteenth aspect of the present disclosure, an invert-emulsion drilling fluid includes a dispersed aqueous phase including an aqueous base fluid, wherein the invert-emulsion drilling fluid includes from 10 wt. % to 30 wt. % of the aqueous base fluid, based on the total weight of the invert-emulsion drilling fluid; a continuous non-aqueous phase including a non-aqueous base fluid, wherein the invert-emulsion drilling fluid includes from 20 wt. % to 50 wt. % of the non-aqueous base fluid, based on the total weight of the invert-emulsion drilling fluid; from 15 wt. % to 50 wt. % manganese tetroxide ($Mn_3O_4$), based on the total weight of the invert-emulsion drilling fluid; and from 3 wt. % to 12 wt. % of a first bridging package, based on the total weight of the invert-emulsion drilling fluid, having trimodal particle size distribution. Particulate carbonate materials having a nominal particle size of from 20 microns to 30 microns define a first portion of particulate carbonate materials; particulate carbonate materials having a nominal particle size of from 40 microns to 60 microns define a second portion of particulate carbonate materials; particulate carbonate materials having a nominal particle size of from 125 microns to 175 microns define a third portion of particulate carbonate materials. The first bridging package includes at least 35 wt. % of a combination of the first portion of particulate carbonate materials, the second portion of particulate carbonate materials, and the third portion of particulate carbonate materials, based on the total weight of the first bridging package.

A twentieth aspect of the present disclosure may include the nineteenth aspect, further including a second bridging package, wherein the second bridging package includes one or more particulate graphite materials and one or more particulate cellulose fiber materials. The second bridging package includes from 20 wt. % to 40 wt. % of the one or more particulate cellulose fiber materials, based on the total weight of the second bridging package; all particulate graphite materials of the invert-emulsion drilling fluid are part of the second bridging package; and a particle size distribution of the one or more particulate graphite materials includes peaks in ranges of: from 40 microns to 60 microns and from 75 microns to 125 microns.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in the present disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. An invert-emulsion drilling fluid comprising:
    a dispersed aqueous phase comprising an aqueous base fluid;
    a continuous non-aqueous phase comprising a non-aqueous base fluid; and
    a first bridging package, wherein:
        the first bridging package consists of particulate carbonate materials;
        all particulate carbonate materials of the invert-emulsion drilling fluid are part of the first bridging package;
        the first bridging package has a trimodal particle size distribution such that the particle size distribution of the first bridging package comprises three peaks, wherein each peak is in the range of less than or equal to 300 microns in the particle size distribution;
        particulate carbonate materials having a nominal particle size of from 20 microns to 30 microns define a first portion of particulate carbonate materials;
        particulate carbonate materials having a nominal particle size of from 40 microns to 60 microns define a second portion of particulate carbonate materials;
        particulate carbonate materials having a nominal particle size of from 125 microns to 175 microns define a third portion of particulate carbonate materials;
        the first portion of particulate carbonate materials comprises 15 wt. % to 40 wt. %, of the total weight of the first bridging package;
        the second portion of particulate carbonate materials comprises 30 wt. % to 80 wt. %, of the total weight of the first bridging package; and
        the third portion of particulate carbonate materials comprises 5 wt. % to 20 wt. %, of the total weight of the first bridging package.

2. The invert-emulsion drilling fluid of claim 1, wherein the trimodal particle size distribution of the particulate carbonate materials comprises peaks in ranges of:
    from 20 microns to 30 microns;
    from 40 microns to 60 microns; and
    from 125 microns to 175 microns.

3. The invert-emulsion drilling fluid of claim 1, wherein the invert-emulsion drilling fluid comprises from 2 wt. % to 20 wt. % of the first bridging package, based on the total weight of the invert-emulsion drilling fluid.

4. The invert-emulsion drilling fluid of claim 1, further comprising a weighting agent comprising from 60 wt. % to 100 wt. % manganese tetroxide ($Mn_3O_4$), based on the total weight of the weighting agent.

5. The invert-emulsion drilling fluid of claim 4, wherein the invert-emulsion drilling fluid comprises from 10 ppb to 800 ppb of the weighting agent, based on the total weight of the invert-emulsion drilling fluid.

6. The invert-emulsion drilling fluid of claim 1, further comprising a second bridging package, wherein:
    the second bridging package comprises one or more particulate graphite materials;
    all particulate graphite materials of the invert-emulsion drilling fluid are part of the second bridging package; and
    a particle size distribution of the one or more particulate graphite materials comprises peaks in ranges of:
        from 40 microns to 60 microns; and
        from 75 microns to 125 microns.

7. The invert-emulsion drilling fluid of claim 6, wherein the second bridging package further comprises at least 15 wt. % of particulate cellulose fiber materials, based on the total weight of the second bridging package.

8. The invert-emulsion drilling fluid of claim 6, wherein the invert-emulsion drilling fluid comprises from 1 wt. % to 5 wt. % of the second bridging package, based on the total weight of the invert-emulsion drilling fluid.

9. A method for reducing lost circulation in a subterranean formation during drilling operations, the method comprising:
    introducing an invert-emulsion drilling fluid into the subterranean formation, the invert-emulsion drilling fluid comprising:
        a dispersed aqueous phase comprising an aqueous base fluid;
        a continuous non-aqueous phase comprising a non-aqueous base fluid; and a first bridging package, wherein:
the first bridging package consists of particulate carbonate materials;
all particulate carbonate materials of the invert-emulsion drilling fluid are part of the first bridging package; and
the first bridging package has a trimodal particle size distribution such that the particle size distribution of the first bridging package comprises three peaks, wherein each peak is in the range of less than or equal to 300 microns in the particle size distribution;
particulate carbonate materials having a nominal particle size of from 20 microns to 30 microns define a first portion of particulate carbonate materials;
particulate carbonate materials having a nominal particle size of from 40 microns to 60 microns define a second portion of particulate carbonate materials;
particulate carbonate materials having a nominal particle size of from 125 microns to 175 microns define a third portion of particulate carbonate materials;
the first portion of particulate carbonate materials comprises 15 wt. % to 40 wt. %, of the total weight of the first bridging package;
the second portion of particulate carbonate materials comprises 30 wt. % to 80 wt. %, of the total weight of the first bridging package; and
the third portion of particulate carbonate materials comprises 5 wt. % to 20 wt. %, of the total weight of the first bridging package.

10. The method of claim 9, wherein the trimodal particle size distribution of particulate carbonate materials comprises peaks in ranges of:
from 20 microns to 30 microns;
from 40 microns to 60 microns; and
from 125 microns to 175 microns.

11. The method of claim 9, wherein the invert-emulsion drilling fluid comprises from 2 wt. % to 20 wt. % of the first bridging package, based on the total weight of the invert-emulsion drilling fluid.

12. The method of claim 9, wherein the invert-emulsion drilling fluid further comprises a weighting agent comprising from 60 wt. % to 100 wt. % manganese tetroxide ($Mn_3O_4$), based on the total weight of the weighting agent.

13. The method of claim 12, wherein the invert-emulsion drilling fluid comprises from 10 ppb to 800 ppb of the weighting agent.

14. The method of claim 9, wherein the invert-emulsion drilling fluid further comprises a second bridging package, wherein:
the second bridging package comprises one or more particulate graphite materials;
all particulate graphite materials of the invert-emulsion drilling fluid are part of the second bridging package; and
a particle size distribution of the one or more particulate graphite materials comprises peaks in ranges of:
from 40 microns to 60 microns; and
from 75 microns to 125 microns.

15. The method of claim 14, wherein the second bridging package further comprises at least 15 wt. % of particulate cellulose fiber materials, based on the total weight of the second bridging package.

16. The method of claim 14, wherein the invert-emulsion drilling fluid comprises from 1 wt. % to 5 wt. % of the second bridging package, based on the total weight of the invert-emulsion drilling fluid.

17. An invert-emulsion drilling fluid, comprising:
a dispersed aqueous phase comprising an aqueous base fluid, wherein the invert-emulsion drilling fluid comprises from 10 wt. % to 30 wt. % of the aqueous base fluid, based on the total weight of the invert-emulsion drilling fluid;
a continuous non-aqueous phase comprising a non-aqueous base fluid, wherein the invert-emulsion drilling fluid comprises from 20 wt. % to 50 wt. % of the non-aqueous base fluid, based on the total weight of the invert-emulsion drilling fluid;
from 15 wt. % to 50 wt. % manganese tetroxide ($Mn_3O_4$), based on the total weight of the invert-emulsion drilling fluid; and
from 3 wt. % to 12 wt. % of a first bridging package, based on the total weight of the invert-emulsion drilling fluid, having trimodal particle size distribution, wherein:
particulate carbonate materials having a nominal particle size of from 20 microns to 30 microns define a first portion of particulate carbonate materials;
particulate carbonate materials having a nominal particle size of from 40 microns to 60 microns define a second portion of particulate carbonate materials;
particulate carbonate materials having a nominal particle size of from 125 microns to 175 microns define a third portion of particulate carbonate materials;
the first portion of particulate carbonate materials comprises 15 wt. % to 40 wt. %, of the total weight of the first bridging package;
the second portion of particulate carbonate materials comprises 30 wt. % to 80 wt. %, of the total weight of the first bridging package; and
the third portion of particulate carbonate materials comprises 5 wt. % to 20 wt. %, of the total weight of the first bridging package.

18. The invert-emulsion drilling fluid of claim 17, further comprising a second bridging package, wherein the second bridging package consists of particulate graphite materials and particulate cellulose fiber materials, wherein:
the second bridging package comprises from 20 wt. % to 40 wt. % of the particulate cellulose fiber materials, based on the total weight of the second bridging package;
all particulate graphite materials of the invert-emulsion drilling fluid are part of the second bridging package; and
a particle size distribution of the particulate graphite materials comprises peaks in ranges of:
from 40 microns to 60 microns; and
from 75 microns to 125 microns.

* * * * *